US009525935B2

(12) United States Patent
Prakash et al.

(10) Patent No.: US 9,525,935 B2
(45) Date of Patent: Dec. 20, 2016

(54) AUDIO PROCESSING DURING LOW-POWER OPERATION

(75) Inventors: Gyan Prakash, Beaverton, OR (US); Guru Raj, Hillsboro, OR (US); Nagasubramanian Gurumoorthy, Portland, OR (US); Selim Aissi, Menlo Park, CA (US)

(73) Assignee: INTEL CORPORATION, Santa Clara, CA (US)

(*) Notice: Subject to any disclaimer, the term of this patent is extended or adjusted under 35 U.S.C. 154(b) by 159 days.

(21) Appl. No.: 13/995,191

(22) PCT Filed: Mar. 28, 2012

(86) PCT No.: PCT/US2012/030917
§ 371 (c)(1),
(2), (4) Date: May 4, 2015

(87) PCT Pub. No.: WO2013/147765
PCT Pub. Date: Oct. 3, 2013

(65) Prior Publication Data
US 2015/0304768 A1  Oct. 22, 2015

(51) Int. Cl.
*H04R 3/00* (2006.01)
*G06F 1/32* (2006.01)

(52) U.S. Cl.
CPC ............ *H04R 3/00* (2013.01); *G06F 1/3209* (2013.01); *G06F 1/3293* (2013.01); *Y02B 60/121* (2013.01); *Y02B 60/32* (2013.01)

(58) Field of Classification Search
CPC ........ G06F 1/3209; G06F 1/3293; H04R 3/00; Y02B 60/32; Y02B 60/121
See application file for complete search history.

(56) References Cited

U.S. PATENT DOCUMENTS

2007/0079161 A1  4/2007  Gupta
2008/0082319 A1  4/2008  Sebestian
(Continued)

FOREIGN PATENT DOCUMENTS

EP   1 221 645 A2   7/2002
WO   2009124911 A1  10/2009
WO   2013/147765 A1 10/2013

OTHER PUBLICATIONS

International Preliminary Report on Patentability and Written Opinion received for PCT Patent Application No. PCT/US2012/030917, mailed on Oct. 9, 2014, 6 pages.
(Continued)

*Primary Examiner* — Brian D Nguyen
(74) *Attorney, Agent, or Firm* — Grossman, Tucker, Perreault & Pfleger, PLLC

(57) ABSTRACT

A system may configure at least a low power engine (LPE) and network interface circuitry when transitioning from an active state to a low-power state. The network interface circuitry may be configured to receive information from a network and to store any received information containing audio information into a memory location. The LPE may be configured to monitor the memory location, to retrieve the stored information from the memory location, to generate audio information based on the stored information and to provide the audio information to audio circuitry for playback. It is also possible for the LPE to receive audio information from the audio circuitry, to generate information for transmission based on the audio information and to store the information into a second memory location. The network interface circuitry may then retrieve the stored information from the second memory location and transmit the information to the network.

22 Claims, 6 Drawing Sheets

(56) References Cited

U.S. PATENT DOCUMENTS

| | | | |
|---|---|---|---|
| 2009/0180579 A1* | 7/2009 | Ellis | H04W 52/028 |
| | | | 375/345 |
| 2011/0039508 A1 | 2/2011 | Lindahl et al. | |
| 2011/0245946 A1 | 10/2011 | Kim et al. | |
| 2011/0314185 A1 | 12/2011 | Conroy et al. | |
| 2012/0087503 A1* | 4/2012 | Watson | H04S 3/008 |
| | | | 381/23 |
| 2012/0246353 A1* | 9/2012 | Lim | G06F 13/28 |
| | | | 710/22 |
| 2012/0268660 A1* | 10/2012 | Lee | G08C 17/02 |
| | | | 348/734 |
| 2013/0166052 A1* | 6/2013 | Kadiyala | H04R 3/00 |
| | | | 700/94 |

OTHER PUBLICATIONS

International Search Report and Written Opinion received for PCT Patent Application No. PCT/US2012/030917, mailed on Nov. 23, 2012, 9 pages.

European Search Report received for European Patent Application No. 12872833.4, mailed on Dec. 1, 2015, 7 pages.

\* cited by examiner

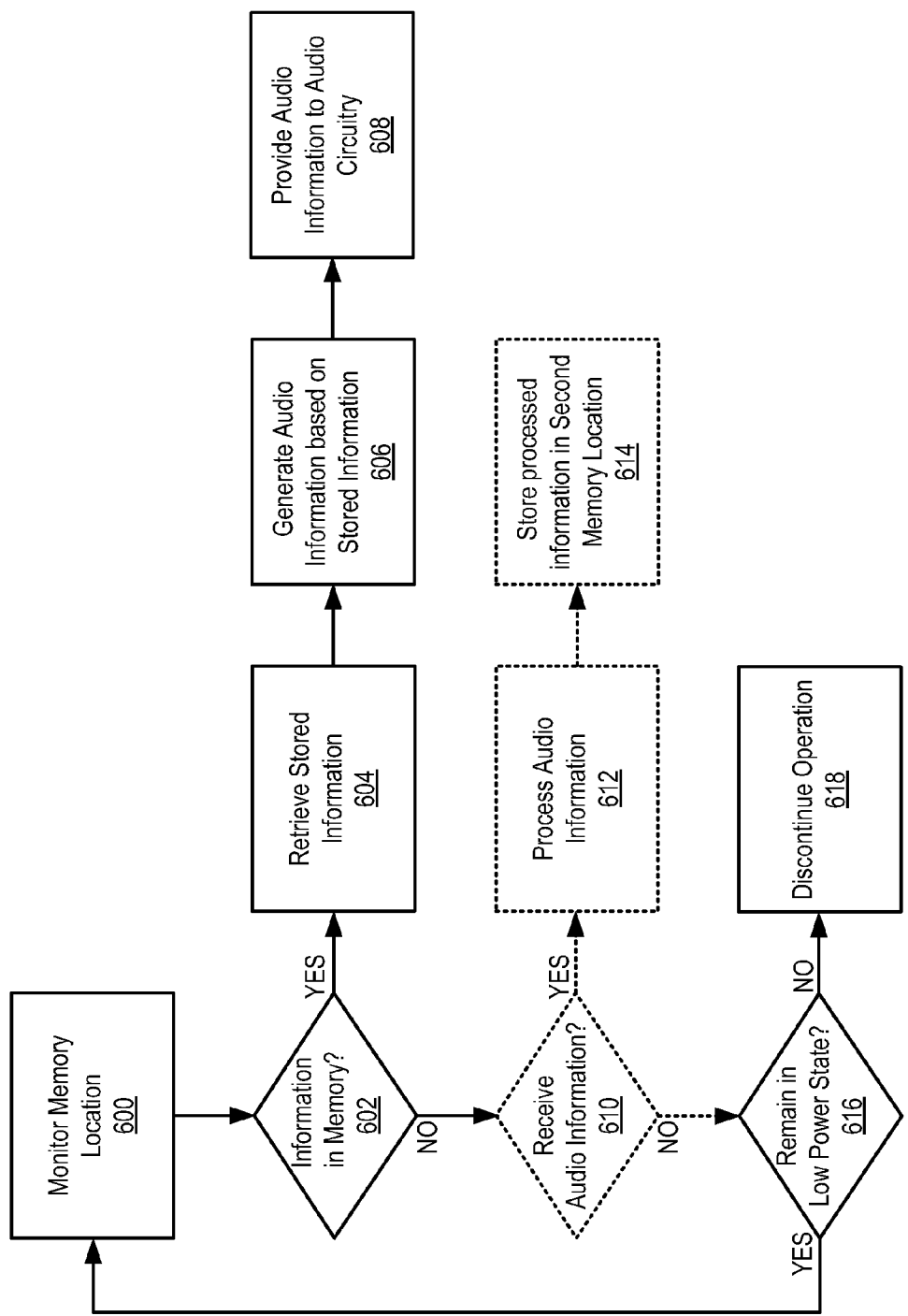

AUDIO PROCESSING DURING LOW-POWER OPERATION

FIELD

The following disclosure relates to power conservation in electronic devices, and more particularly, to systems and methods for providing functionality during low power operation.

BACKGROUND

Electronic devices may be configured to conserve energy by transitioning from an active operational state to a low-power operational state during inactive periods. For example, a device may comprise a main platform including circuitry such as, but not limited to, processing circuitry, wired and/or wireless communication circuitry, user interface circuitry (display, audio, keyboard, indicators, etc.), input/output (I/O) circuitry, etc. In the active state the device may be fully operational in that all of the resources of the main platform may be energized and available to support any activities that may occur in the device. The device may then transition to a low-power (e.g., sleep) state following completion of these activities. The low-power state, while providing substantial energy conservation in the device, severely limits the abilities of the device since main platform processing is not available. In addition, some activities may occur spuriously, such as various forms of communication like email, messaging, voice/video calling, etc. During spurious activities, the device may inadvertently cut off ongoing interaction by entering the low-power state under the false pretense that no activities remain pending. As a result, the device must be maintained continuously in an active state to support desired communication-related activities, causing the device to expend a substantial amount of energy.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 6 illustrates a flowchart of example operations from the perspective of a low power engine in accordance with at least one embodiment of the present disclosure.

Figure 1:
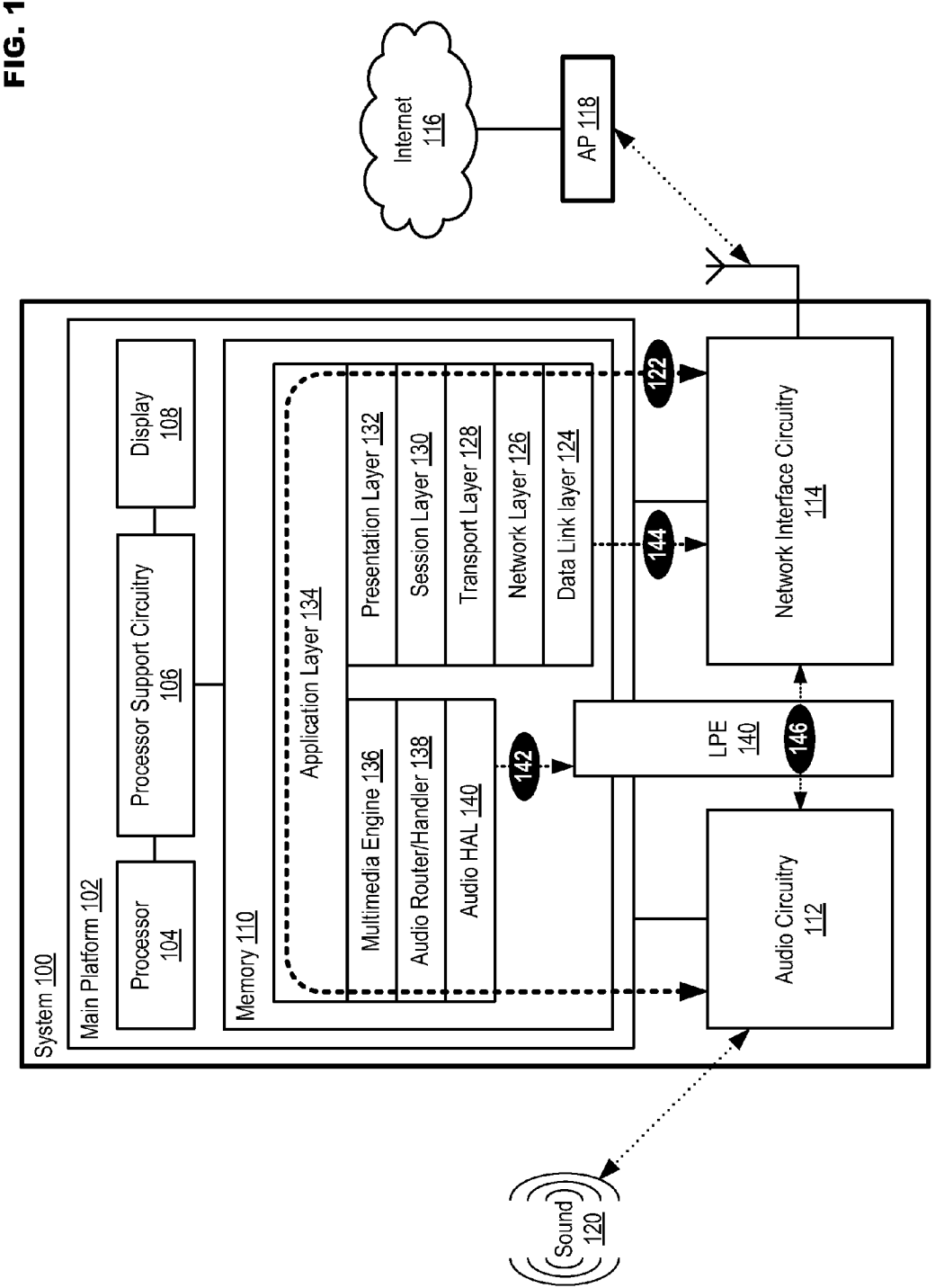
FIG. 1 illustrates an example system configured for audio processing during low-power operation in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

Generally, this disclosure describes a system for audio processing during low-power operation. A system may be configured to operate in at least two states: an active state and a low-power state. As referred to herein, the active state may be a mode of operation wherein most of the circuitry in the system is energized, while the low-power state may be a mode of operation wherein only essential resources in the system are energized in order to save power. The system may comprise at least a main platform, audio circuitry, network interface circuitry and a low-power engine (LPE). When the system is in the active state, the main platform may orchestrate most of the processing in the system, which it may perform in conjunction with the audio circuitry and/or network interface circuitry when applicable (e.g., when generating and/or capturing sound, when interacting with a network, etc). The main platform may be configured to pause operation (e.g., power down) when the system transitions from the active state to the low-power state. In one embodiment, some of the processing handled by the main platform in the active state may be offloaded onto the audio circuitry, network interface circuitry and LPE, which may continue to operate while the system is in the low power state. In this manner, audio processing based on network interaction (e.g., streaming audio from a wired/wireless network, voice over Internet protocol (VoIP) telephone calls, etc.) may continue while the system is in the low-power state, allowing a user to continue interaction with the system while conserving power.

In one embodiment, the network interface circuitry may include offload resources that are configured to operate when the system is in the low-power state. For example, an offload engine may continue to maintain connectivity with network resources (e.g., a wireless connection to the Internet) while the system is in the low-power state. When maintaining connectivity to network resources, the offload engine may utilize information provided by the main platform (e.g., when the system transitions from the active state to the low-power state). Information provided by the main platform may include, but is not limited to, a series of keep-alive messages for maintaining connectivity to the network resources and filter information indicating how to handle (e.g., route) information coming from, and going to, network resources. For example, filter information may include offload filters and wake filters. Offload filters may indicate packet routing information (e.g., for incoming/outgoing audio information). Wake filters may identify situations that require the system to transition from the low-power state to the active state. For example, the wake filter may identify certain types of information, certain operations, etc. that require the main platform for processing, and in such instance the network interface circuitry may transmit a signal to the main platform causing the system to transition back to the active state. In one embodiment, the offload engine may use filter information to identify incoming information (e.g., packets) that contains audio information. The offload engine may then store (e.g., via direct memory access) the incoming information in a particular memory location being monitored by the LPE.

In the same or a different embodiment, the LPE may monitor a register associated with a particular memory location, and may determine that new information was stored in the memory location based on the register. The LPE may then retrieve the contents of the memory location, may generate audio information based on the stored information, and may cause the audio circuitry to generate sound based on the audio information. In performing the above activities, the LPE may access/utilize codec drivers, bus drivers, sound card drivers, etc. available from resources in the main platform of the system. An example of the above activities in practice may include listening to streaming audio or to the voice of another party in a telephone call when the device is in the low-power state. However, in the same or a different embodiment it may also be possible for audio circuitry to capture sound (e.g., the voice of someone talking into the device). In such instance the LPE and network interface circuitry to operate in a reverse manner to what is described above. In particular, the LPE may receive audio information captured by the audio circuitry and may generate information configured for transmission on a network based on the audio information. The LPE may then store the information for transmission on a network in a second memory location that is being monitored by the offload engine. The offload engine may detect that information has been stored in the second memory location (e.g., by monitoring a register associated with the second memory location), may retrieve the stored information and may transmit the stored information to a network resource (e.g., indicated by the offload filters).

FIG. 1 illustrates example system 100 configured for audio processing during low-power operation in accordance with at least one embodiment of the present disclosure. System 100 may be a single "all-in-one" device or may include multiple components.

Examples of system 100 may include a mobile communication device such as cellular handset or a smartphone based on the Android® operating system (OS), iOS®, Blackberry® OS, Palm® OS, Symbian® OS, etc., a mobile computing device such as a tablet computer like an ipad®, Galaxy Tab®, Kindle Fire®, Nook®, etc., an Ultrabook® including a low-power chipset manufactured by Intel Corp., a netbook, a notebook computer, a laptop computer, etc. System 100 may also include typically stationary devices like desktop computers, teleconferencing systems, entertainment systems, etc. In the following disclosure references may be made to elements of smartphones running on the Android® OS. These references have been made herein only for the sake of example, and are not intended to limit the application of the various embodiments to only within Android® OS. On the contrary, the various embodiments may be applied to almost any system having power saving features.

System 100 may include main platform 102. Main platform 102 may comprise circuitry configured to orchestrate operations when system 100 is in the active state. For example, main platform circuitry 102 may interact with audio circuitry 112 and network interface circuitry 114 in providing functionality such as streaming audio from the Internet, conducting a VoIP call, etc. Main platform 102 may include, but is not limited to, processor 104, processor support circuitry 106, display 108 and memory 110. Processor 104 may comprise one or more processors situated in separate components, or alternatively, may comprise one or more processing cores in a single component (e.g., in a System-on-a-Chip (SOC) configuration). Example processors may include various X86-based microprocessors available from the Intel Corporation including those in the Pentium, Xeon, Itanium, Celeron, Atom, Core i-series product families. Processor 104 may be configured to communicate with other circuitry in system 100 using processor support circuitry 106. For example, processor support circuitry 106 may include a core logic chipset configured to support processor 104 including memory controllers, graphic controllers, bus controllers, etc. that allow processor 104 to interact with other elements of main platform 102 such as display 108 and memory 100, as well as other elements of system 100 such as audio circuitry 112 and network interface circuitry 114. While processor support circuitry 106 may be a separate chipset including two or more individual integrated circuits (ICs) such as, for example, Northbridge and Southbridge chipsets manufactured by Intel Corporation, some or all of the functionality may also be incorporated within processor 104. Display 108 may include displays based on cathode ray tube (CRT), liquid crystal, plasma, light emitted diode (LED), active-matrix organic light-emitting diode (AMOLED), etc. technology that may be integrated within system 100 (e.g., as in a communication device, mobile computing device, etc.) or may be externally coupled to system 100 (e.g., as in an external computer monitor, television, etc.).

Processor 104 may be configured to execute instructions. Instructions include program code that, when executed by processor 104, may cause processor 104 to perform activities such as, for example, reading (e.g., accessing) data, writing (e.g., storing) data, processing data, formulating data, converting data, transforming data, generating data, etc. Instructions, data, etc. may be stored in memory 110. Memory 110 may comprise random access memory (RAM) and/or read-only memory (ROM) in a fixed or removable format. RAM may include memory configured to hold information during the operation of system 100 such as, for example, static RAM (SRAM) or Dynamic RAM (DRAM). ROM may include memories such as bios memory configured to provide instructions when system 100 activates, programmable memories such as electronic programmable ROMs, (EPROMS), Flash, etc. Other fixed and/or removable memory may include magnetic memories such as floppy disks, hard drives, etc., electronic memories such as solid state flash memory (e.g., eMMC, etc.), removable memory cards or sticks (e.g., uSD, USB, etc.), optical memories such as compact disc-based ROM (CD-ROM), etc.

Audio circuitry 112 may comprise circuitry configured to produce sound (e.g., a speaker) or capture sound (e.g., a microphone) and any related supporting resources (e.g., a sound card, amplifier, etc.) Moreover, some or all of audio circuitry 112 may be integrated into system 100, such as in the instance of a cellular handset that includes a built-in speaker and microphone for conducting telephone calls, or may be coupled to system 100 via a wired/wireless connection. For example, an earpiece or headphones including a microphone may be coupled to system 100 via a wire or through a wireless connection like, for example, a Bluetooth wireless connection.

When system 100 is in the active state, network interface circuitry 114 may be configured to manage wired and/or wireless communications for system 100. Wired communications may include mediums such as, for example, Universal Serial Bus (USB), Ethernet, etc. Wireless communications may include, for example, close-proximity wireless mediums (e.g., radio frequency (RF) such as Near Field Communication (NFC), infrared (IR), etc.), short-range wireless mediums (e.g., Bluetooth, wireless local area networking (WLAN), etc.) and long range wireless mediums (e.g., cellular, satellite, etc.). For example, network interface circuitry 114 may be configured to prevent the various wireless communications active in system 100 from interfering with each other. In performing this function, network interface circuitry 114 may schedule communication activities based on the relative priority of the pending messages.

In one embodiment, system 100 may be employed in activities that result in sound being generated from information received via a network, or conversely, in transmitting sound captured by system 100 over the network. Examples of such activities may include, but are not limited to, streaming audio content (e.g., music, news reports, reviews, speeches, lectures, book narrations, etc.) from a resource available over the Internet, conducting a VoIP telephone call, participating in an online meeting hosted by a meeting service, etc.

In one embodiment, information (e.g., one or more packets) may be received via Internet 116 through a wireless connection. In particular, system 100 may be coupled to Internet 116 via wireless connection to access point (AP) 118 (e.g., via WLAN). Presuming that system 100 is in the active state, the received information may generate sound 120 as a result of being processed by system 100 as shown by the line at 122. For example, incoming packets received by network interface circuitry 114 may initially be processed by a protocol stack composed of layers 124 to 132 in memory 110. The example protocol stack depicted in FIG. 1 following the open systems interconnection (OSI) model, and has been utilized herein merely for the sake of explanation. The actual layers of protocol stacks may vary depending on the protocol being employed. For example, packets may be received at data link layer 124, which receives the information from the network interface circuitry 114 and may correct any errors. Network layer 126 then receives the information from data link layer 124 and may perform network-to-network routing functions as well as fragmentation and reassembly of the information. Transport layer 128 then receives the information from network layer 126 and may provide transparent transfer of data between end users and flow control to ensure the reliability of the connection. Session layer 130 then receives the information from transport layer 128 and may establish, manage and terminate connections between local and remote applications. Presentation layer 132 then receives the information and may format the information in a context that is compatible with the application in application layer 134. The application (e.g., a music streaming application, a VoIP application, etc.) may then receive the information. As the received information may contain audio information, the application may then cause the audio information to be sent to audio circuitry in system 100.

Continuing with processing path 122 as illustrated in FIG. 1, a sound-related application executing in application layer 132 (e.g., MediaPlayer in the Android® OS) may then transmit the audio information received from Internet 116 to multimedia engine 136. Multimedia engine 136 (e.g., StageFright in Android® OS) may include decoders, codecs, etc. for processing the audio information. For example, multimedia engine 136 may be responsible for rending audio, and it may also provide a time base for timing and A/V synchronization whenever a video comprises an audio track. The processed audio information may then be provided to audio router/handler 138. Audio router/handler 138 (e.g., Audioflinger in the Android® OS) may be responsible for sound enhancement processing of the decoded/extracted audio information. For example, audio router/handler 138 may provide stereo/mono output paths at a specified sample rate, playback mixing based on the type of audio stream, output frequency adjustment, etc. The processed audio may then be provided to audio hardware extraction layer (HAL) 140. Audio HAL 140 provides a standard programmatic interface for audio circuitry 112 so that every application in system 100 does not have to know how to, for example, make a sound card in audio circuitry 112 generate sound from a speaker based on the processed audio information. Instead, the processed audio information is provided to audio HAL 140, which facilitates the generation of sound 120. Sound 120 may then be generated by audio circuitry 112. It is important to note that, while the above discussion of processing path 122 explains an example generation of sound 120 based on information received from a network (e.g., Internet 116), the above process may also be executed in reverse. For example, sound 120 (e.g., a user's voice) may be captured by audio circuitry 112 as audio information that may be processed by software elements 140 to 124 in reverse in order to generate information for transmission from network interface circuitry 114 to Internet 116.

While the above process may be used to receive information from which sound may be generated, and likewise to receive sound from which information for transmission on a network may be generated, in existing system these processes may only be performed when system 100 is in the active state. However, in at least one embodiment resources are available in system 100 to support the above activities also when system 100 is in the low-power state. In particular, main platform 102 may handle most of the processing illustrated, for example, by processing path 122 when system 100 is in the active state. However, system 100 may transition to a low-power state at certain instances to conserve power. When transitioning to the low power state, main platform 102 may configure (e.g., may at least provide configuration information to) network interface circuitry 114 and/or low power engine (LPE) 140 as shown at 142 and 144. LPE 140 may be an entity in system 100 configured to provide processing functionality when system 100 is in the low-power state. LPE 140 may exist wholly as software (e.g., program code) in system 100, or may comprise both software and hardware. In one embodiment, during low-power operation LPE 140 may be configured to receive information from network interface circuitry 114, to process the received information, and to cause audio circuitry 112 to generate sound based on the audio information as shown at 146. In one embodiment, LPE 140 may also be configured to receive audio information based on sound captured by audio circuitry 112, to generate information for transmission on a network based on the audio information, and to provide the information for transmission on the network to network interface circuitry 114 for transmission to Internet 116. In this manner, system 100 may transition to the low-power state (e.g., main platform 102 may become inactive, power down, etc.), but may continue to support activities such as audio streaming, VoIP calling, and various other activities involving sound and network connectivity.

Figure 2:
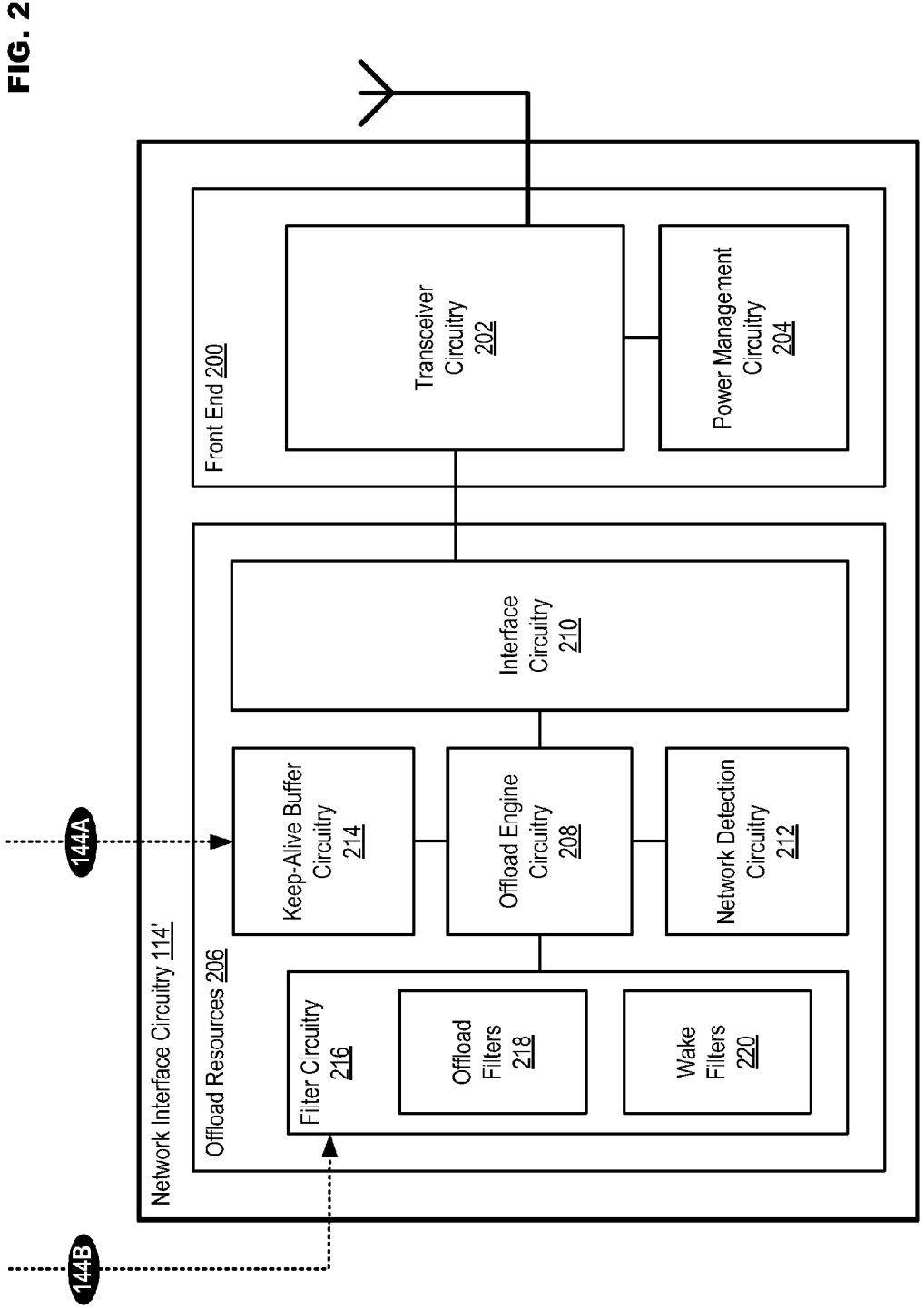
FIG. 2 illustrates example network interface circuitry in accordance with at least one embodiment of the present disclosure.

FIG. 2 illustrates example network interface circuitry 114' in accordance with at least one embodiment of the present disclosure. Network interface circuitry 114' may comprise some resources that are always operational (e.g., when system 100 is in the active state and the low-power state) and some resources that are only operational when system 100 is in the low-power state. For example, front end 200 may be configured to facilitate communication (e.g., transmit and receive information via wired and/or wireless communication) when system 100 is both in the active state and low-power state. Front end 200 may include transceiver circuitry 202 and power management circuitry 204. Transceiver circuitry 202 may be configured to, for example, transmit packets to, and receive packets from, a network (e.g., Internet 116) via wired or wireless communication, and may include any hardware/software typically associated with physical layer operation for the communication mediums being employed by system 100. Power management circuitry 204 may be configured to manage the wireless transmission power of network interface circuitry 114'. Wireless transmission power may be controlled in order to save power in system 100 while also ensuring a stable wireless connection to a network such as, for example, AP 118.

Offload resource 206 in network interface circuitry 114' may operate when system 100 is in the low-power state. Offload resource 206 may include offload engine circuitry 208, interface circuitry 210, network detection circuitry 212, keep alive buffer circuitry 214 and filter circuitry 216. Offload engine circuitry 208 may provide processing resources configured to transmit and receive information in network interface circuitry 114' when system 100 is in the low-power state. For example, offload engine circuitry 208 may send outgoing packets to front end 200, and may receive incoming packets from front end 200, via interface circuitry 210. Network detection circuitry 212 may be configured to cause offload engine circuitry 208 and/or front end 200 to scan for available wireless networks, and to connect to available wireless networks (e.g., known or recognized wireless networks). Keep-alive buffer circuitry 214 may comprise a group of messages configured to be transmitted by offload engine circuitry 214 in order to keep system 100 connected to network resources (e.g., resources located on Internet 116). For example, some communications may occur spuriously such as, for example, schedule or emergency alerts, push email, messaging, incoming audio or video-based communications like telephone/video calls, etc. However, traditional systems are not able to receive these communications when in the low power state since connectivity is severed with the network resources. The transmission of keep-alive messages maintains open connections to remote resources on a network (e.g., Internet 116), allowing spurious communications to be received by system 100 while in the low-power state. System 100 may be configured to generate keep-alive messages when in the active state, and to provide the generated keep-alive messages to keep-alive buffer circuitry 214 when system 100 transitions to the low-power state as shown at 144A. Keep-alive messages may be encrypted based on keys exchanged between system 100 and any remote resource with which system 100 desires to maintain connectivity. When all of the keep-alive messages have been transmitted, system 100 may transition back to the active state in order to generate more keep-alive messages.

Communications received by network interface circuitry 114' may be sorted or "filtered" by offload engine 208 based on information in filter circuitry 216. Filter circuitry may provide criteria for conducting operations in network interface circuitry 114' during low-power operation, and may be configured using information provided by main platform 102 as shown at 144B. For example, filter circuitry 216 may include offload filters 218 and wake filters 220. Offload filters 218 may include information usable by offload engine 208 for routing information in system 100. For example, incoming information may be routed to parts of system 100 that are operational in the low-power state (e.g., LPE 140). Similarly, outgoing information may be formatted for transmission to a certain entity on a network to which system 100 is connected. Some information that is received through network interface circuitry 114' may require resources in main platform 102 in order to be processed. Wake filters 220 may indicate certain situations (e.g., the receipt of certain types of information) that require system 100 to transition from the low-power state to the active state. Offload engine circuitry 208 may utilize wake filters 220 in order to check incoming information for situations that require active state operation, and if active state operation is determined to be required, may transmit a signal, set an indicator (e.g., a bit being monitored by main platform 102), etc. in order to cause system 100 to transition from the low-power state to the active state.

Figure 3:
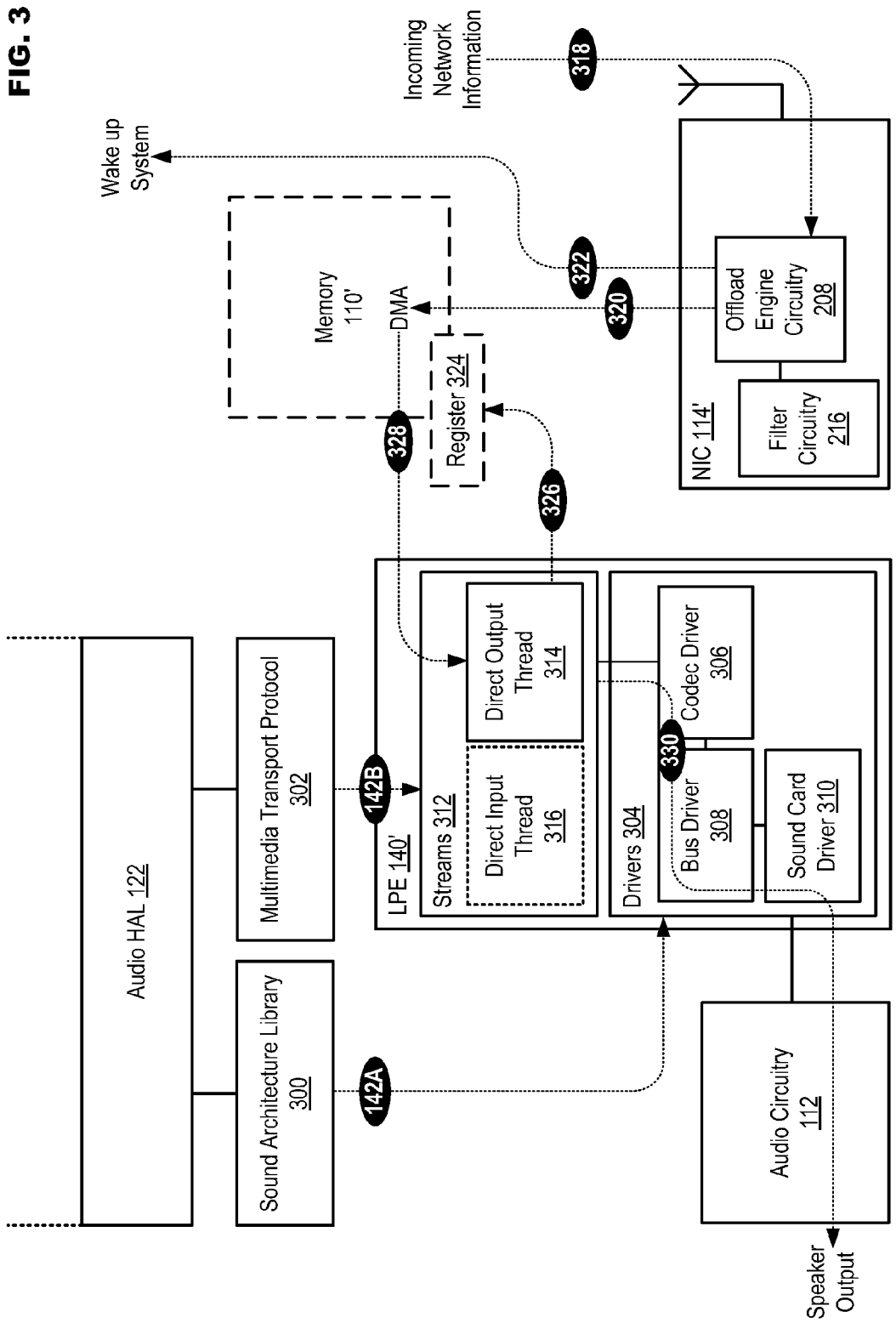
FIG. 3 illustrates an example of sound generation using information derived from a network source in accordance with at least one embodiment of the present disclosure.

FIG. 3 illustrates an example of sound generation using information derived from a network source in accordance with at least one embodiment of the present disclosure. In general, information coming from a network source may be received in system 100 and may be stored to a memory. Resources operative when system 100 is in the low-power state (e.g., LPE 140) may retrieve the stored information from the memory, generate audio information from the stored information and cause audio circuitry 112 to generate sound based on the audio information.

In one embodiment, when system 100 transitions from the active state to the low-power state, input and/or output processing pipelines (e.g., threads, streams, etc.) in LPE 140' may be configured to process audio information, the configuration being based on information provided by main platform 102 such as, for example, illustrated at 142A and 142B. In one embodiment, audio HAL 122 may include, or alternatively, may be configured to access, sound architecture library 300 (e.g., Advanced Linux Sound Architecture (ALSA) Library in Android® OS) and multimedia transport protocol 302 (e.g., a structured stream transport (SST) driver in Android® OS). Sound architecture library 300 may be used for configuring drivers 304 in LPE 140'; while multimedia transport protocol 302 may be used for configuring streams 312 in LPE 140'. For example, sound architecture library 300 may include codec (compressor/decompressor) driver 306 and possibly bus driver 308 (e.g., for an $I^2C$ bus or another similar type of serial bus) that are accessible for use by LPE 140' during low-power operation. Drivers 304 may also include sound card driver 310 available from sound architecture library 300 or from another source, such as in the instance of a proprietary sound card driver associated with audio circuitry 112. In addition, a direct output thread 314 may be configured by multimedia transport protocol 302. For example, in terms of Android® OS the SST driver may interact with an LPE inter-process communication (IPC) driver to accept processing responsibilities from multimedia transport protocol 302 during low-power operation. In various embodiments, direct input thread 316 may also be configured in streams 316 to, for example, process sound captured by audio circuitry 112 into information that is transmittable by network interface circuitry 114'). However, in FIG. 3 direct input thread 316 is not utilized since only output operations are discussed (input operations explained in FIG. 4).

Information flow 318-330 illustrated in the example of FIG. 3 presumes that system 100 has configured LPE 140' and NIC 114', and has completed transitioning to the low-power state. In one embodiment, incoming network information 318 may be received in network interface circuitry 114'. For example, network interface circuitry 114' may receive information from Internet 116 via a short-range wireless connection to AP 118. Offload engine circuitry 208 may then be configured to determine how to route incoming network information 318 based on filter circuitry 216. For example, filter circuitry 216 may indicate that incoming network information 318 will require processing by main platform 102, and thus, offload engine circuitry 208 may transmit a signal to cause system 100 to transition from the low-power state to the active state as shown at 322. Alternatively, filter circuitry 216 may indicate a destination to which incoming network information 318 may be routed. In one embodiment, if incoming network information 318 comprises audio information, the filter circuitry may indicate to offload engine 208 that incoming network information 318 should be stored in memory 110'. Memory 110' may be, for example, a memory location in the memory of system 100 associated with main platform 102, or may be a memory location in a separate memory accessible to at least network interface circuitry 114' and LPE 140' when system 100 is in the low-power state. For example, memory 110' may reside in network interface circuitry 114'. In one embodiment, offload engine circuitry 208 may place some or all of the received information into a particular memory location in memory 110' via direct memory access (DMA) as shown at 320. Register 324, associated with memory 110', may be updated to reflect that the contents of the particular memory location have been updated.

In one embodiment, LPE 140' (e.g., direct output thread 314) may monitor register 324 as shown at 326. Upon determining that the contents of the particular memory location in memory 110' have changed, direct output thread 314 may retrieve the contents of the memory location as shown at 328. Direct output thread 314 may then generate audio information based on the stored information (e.g., the contents of the particular memory location) and may cause audio circuitry 112 to generate sound based on the audio information as shown at 330. The processing of the stored information may include utilizing codec driver 306 to decompress the stored information, bus driver 308 to access audio circuitry 112, and sound card driver 310 to cause audio circuitry 112 to produce sound based on the audio information. The sound that is generated from audio circuitry 112 is indicated as "speaker output" in FIG. 3. While not illustrated, additional audio processing (e.g., mixing, equalization, etc.) may be performed by direct output thread 314 depending on the resources available to LPE 140' when system 100 is in the low-power state.

Figure 4:
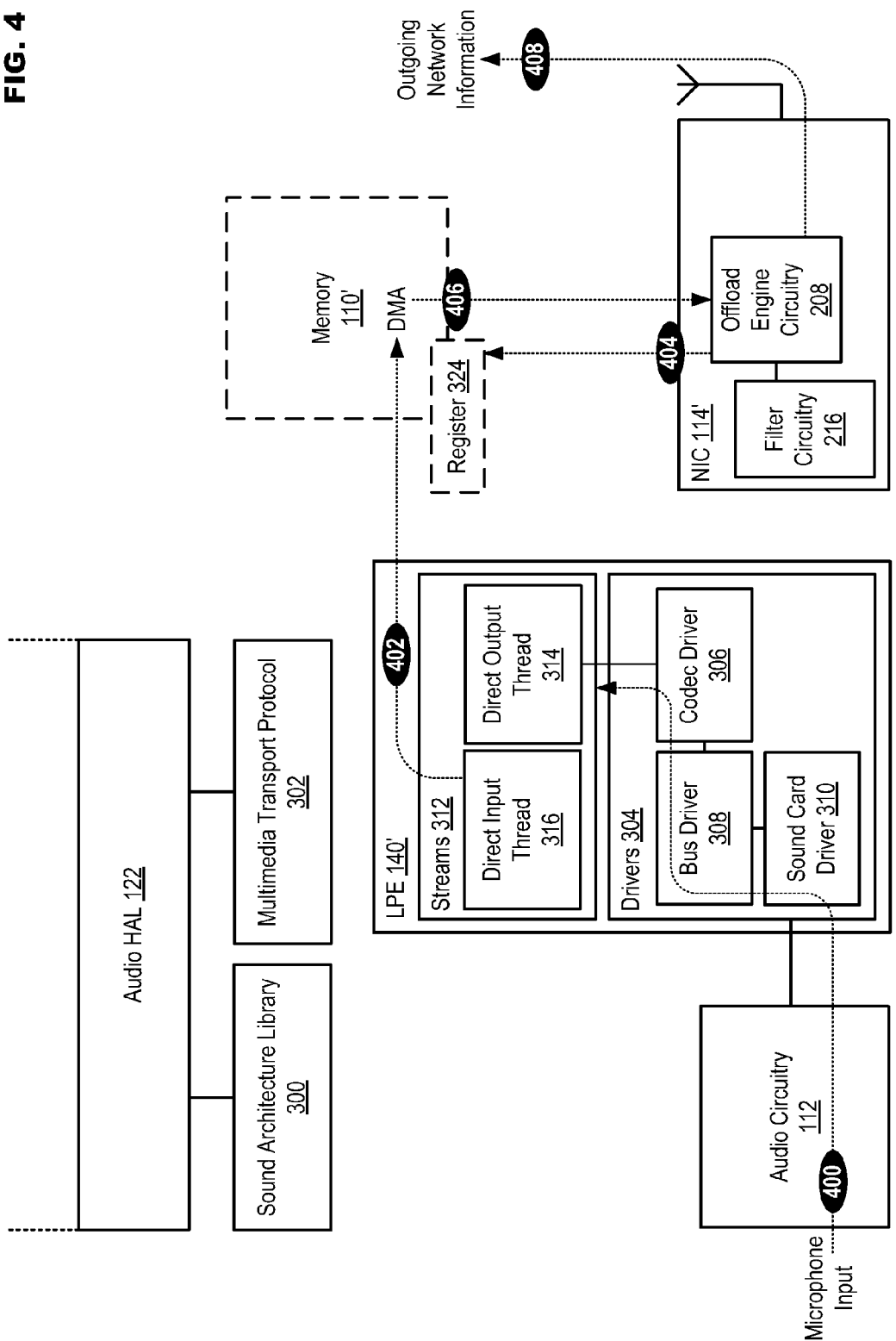
FIG. 4 illustrates an example sound capture, processing and transmission via a network in accordance with at least one embodiment of the present disclosure.

FIG. 4 illustrates an example sound capture, processing and transmission via a network in accordance with at least one embodiment of the present disclosure. The operations illustrated in FIG. 4 may be used alone or in conjunction with the operations disclosed in FIG. 3. Sound may be captured, for example, during a VoIP telephone conversation being conducted by the user of system 100, during group conferencing, etc. As shown at 400, sound may be captured by audio circuitry 112 (e.g., as audio input to a microphone) and may be processed by audio circuitry 112 and/or LPE 140' in order to generate audio information. The audio information may then be further processed by LPE 140' in order to generate information suitable for transmission. For example, the audio information may be compressed using codec driver 306 in preparation for transmission to a remote resource on a network (e.g., Internet 118). In one embodiment, direct input thread 316 may then store the information for transmission to a second memory location in memory 110' via DMA as shown at 402. Network interface circuitry 114' may monitor register 324 associated with memory 110' as shown at 404, may determine that the contents of the second memory location have changed, and may retrieve the contents of the second memory location as shown at 406. Offload engine may then cause network interface circuitry 114' to transmit the retrieved contents of the second memory location as outgoing network information as shown at 408. In one embodiment, the destination for the information transmitted by network interface circuitry 216 (e.g., the outgoing network information) may be determined based on information in filter circuitry 216. For example, filter circuitry 216 may indicate to route the outgoing network information to a particular remote resource residing on a network (e.g., Internet 118).

In one embodiment, an ongoing communication (e.g., a VoIP telephone call) may be started when system 100 is in the active state and may be continued after system 100 transitions to the low-power state. For example, in the instance of a VoIP telephone call main platform 102 may set up the call with a standard sample rate (e.g., 16 KHz) during active state operation, and may then configure direct output thread 314 and direct input thread 316 to take over the inbound and outbound audio processing for VoIP call as system 100 transitions to the low-power state. It is possible for the sampling rate to change between main platform 102 and LPE 140, depending on the capability of system 100, which may cause the transition to fail and the call to be dropped. In one embodiment, main platform 102 may briefly pause its stream during transition, and may then restart the stream after it is offloaded to LPE 140 in order to avoid corruption of the call.

Figure 5:
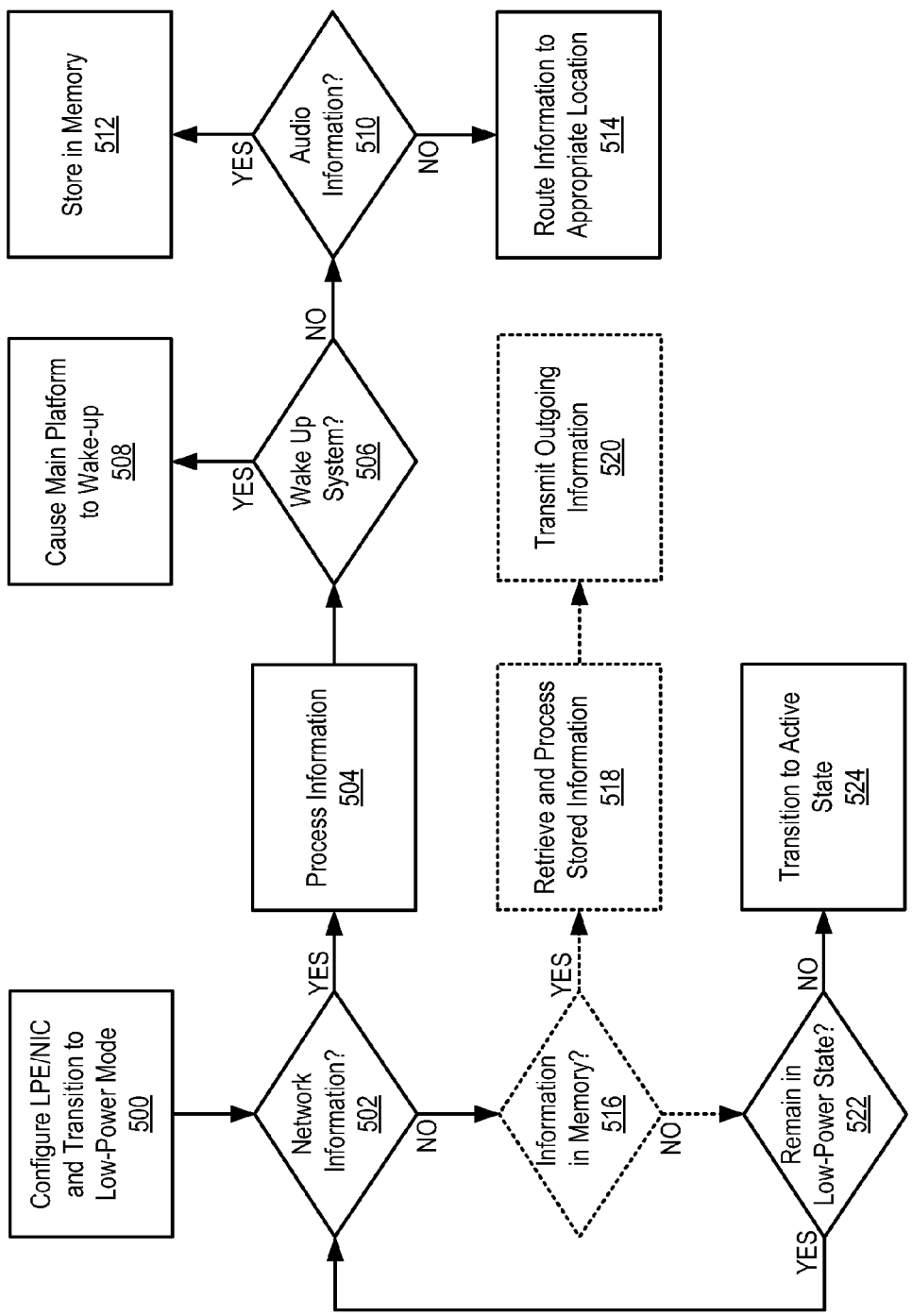
FIG. 5 illustrates a flowchart of example operations from the perspective of network interface circuitry in accordance with at least one embodiment of the present disclosure.

FIG. 5 illustrates a flowchart of example operations from the perspective of network interface circuitry 114 in accordance with at least one embodiment of the present disclosure. In operation 500 configure LPE 140 and network interface circuitry 114 may be configured by system 100 during, for example, the transition of system 100 from the active state to the low-power state. In operation 502 a determination may be made as to whether network information has been received network interface circuitry 502. Network information may be received from, for example, from a remote resource situated on a network interacting with system 100 via wireless communication. If a determination is made that network information has been received, then in operation 504 the network information may be processed. Processing may include, for example, comparing the network information to filter information in network interface circuitry 114. A determination may then be made in operation 506 as to whether the network information requires processing resources that are only available when system 100 is in the active state. If a determination is made that system 100 needs to transition from the low-power state to the active state, in operation 508 network interface circuitry 114 may cause main platform 102 to wake-up. Network interface circuitry 114 may cause main platform 102 to wake up by transmitting a wake up signal, setting a bit monitored by a power control entity in system 100, etc. If in operation 506 it is determined that system 100 does not need to wake-up, then in operation 510 a further determination may be made as to whether the network information comprises audio information. If in operation 510 it is determined that the network information comprises audio information, then in operation 512 some or all of the network information may be written to memory (e.g., to a memory location being monitored by LPE 140 through a register associated with the memory). Otherwise, if the network information is determined not to contain audio information, some or all of the network information may be routed to an appropriate location in system 100 (e.g., as indicated by the filter information in network interface circuitry 114).

Returning to operation 502, optional operations 516 to 520 may occur if a determination is made that no network information has been received in network interface circuitry 114. For example, operations 516 to 520 may only occur in applications where system 100 is involved in two-way communication (e.g., a VoIP telephone call, group conferencing, etc.), but may not be appropriate for one-way communication (e.g., streaming audio from an Internet source, etc.) A determination may then be made in operation 516 as to whether information has been stored in a second memory location being monitored by network interface circuitry 114. The determination may be based on, for example, network interface circuitry 114 monitoring a register associated with the memory. If it is determined that new information has been stored in the second memory location, then in operation 518 the stored information may be retrieved and further processed in preparation for transmission to a resource located on a network (e.g., Internet 118). In operation 520 network interface circuitry 114 may transmit the information. Returning to operation 516, if a determination is made that no new information has been stored in the second memory location, the process may then proceed to operation 522 wherein a further determination may be made as to whether network interface circuitry 114 should continue to operate in the low power state. For example, system 100 may decide to transition from the low-power state to the active state based on user prompting (e.g., manual reactivation), internal prompting (e.g., a processing need from an internal resource), etc. If a determination is made that network interface circuitry 114 should continue with low-power operation, then the flow may continue by returning to operation 502. Otherwise, in operation 524 network interface circuitry 114 may transition to the active state.

FIG. 6 illustrates a flowchart of example operations from the perspective of LPE 140 in accordance with at least one embodiment of the present disclosure. In operation 600 LPE 140 may monitor a memory location into which information containing audio information is stored by network interface circuitry 114. In one embodiment, LPE 140 may monitor a register that is associated with the memory. A determination may then be made in operation 602 as to whether new information has been stored in the memory location (e.g., based on the monitoring of the register). If it is determined that new information has been stored in the memory location, then in operation 604 LPE 140 may retrieve the stored information from the memory location. In operation 606 LPE 140 may generate audio information based on the stored information. The audio information may then be provided to audio circuitry 112 in operation 608 (e.g., so that audio circuitry 112 may generate sound from system 100 based on the audio information.

Returning to operation 602, if it is determined that new information has not been stored in the memory location, then optional operations 610 to 614 may occur if applicable. Similar to the example disclosed in FIG. 5, optional operations 610 to 614 may only occur during applications where two-way communication may occur (e.g., a VoIP telephone call, group conferencing, etc.) A further determination may be made in operation 610 as to whether audio information has been received in LPE 140. For example, audio information may be received from audio circuitry 112 as a result of capturing sound via a microphone. If it is determined that audio information has been received, then in operation 612 the audio information may be processed (e.g., in preparation for transmission to a resource residing on a network). For example, the audio information may be compressed, segmented, etc. in order to reduce the size of the audio information. The audio information may then be stored in a second memory location in operation 614 (e.g., a memory location that is being monitored by network interface circuitry 114). Returning to operation 610, if it is determined that no audio information has been received then a further determination may be made in operation 616 as to whether LPE 140 should continue with low-power operation. If a determination is made that low-power operation should continue, then the flow may continue with operation 600. Otherwise, in operation 618 LPE 140 may discontinue operation (e.g., since LPE 140 is only invoked when system 100 is in the low power state).

While FIGS. 5 and 6 illustrate various operations according to multiple embodiments, it is to be understood that not all of the operations depicted in FIGS. 5 and 6 are necessary for other embodiments. Indeed, it is fully contemplated herein that in other embodiments of the present disclosure, the operations depicted in FIGS. 5 and 6, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices.

"Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present disclosure provides systems and methods for audio processing during low-power operation. A system may configure at least a low power engine (LPE) and network interface circuitry when transitioning from an active state to a low-power state. The network interface circuitry may be configured to receive information from a network and to store any received information containing audio information into a memory location. The LPE may be configured to monitor the memory location, to retrieve the stored information from the memory location, to generate audio information based on the stored information and to provide the audio information to audio circuitry for playback. It is also possible for the LPE to receive audio information from the audio circuitry, to generate information for transmission based on the audio information and to store the information into a second memory location. The network interface circuitry may then retrieve the stored information from the second memory location and transmit the information to the network.

The following examples pertain to further embodiments. According to one aspect there is provided a system. The system may include a main platform circuitry configured to operate when the system is in an active state, network interface circuitry configured to receive filter information from the main platform circuitry when the system transitions from the active state to a low power state, and to operate using the filter information when the system is in the low power state, audio circuitry configured to at least generate sound based on audio information and low-power processing circuitry configured to at least retrieve information stored in a memory by the network interface circuitry and to provide audio information based on the retrieved information to the audio circuitry when the system is in a low power state.

The above system may further comprise circuitry configured to transmit information to, and receive information from, at least one network, and circuitry configured to handle the received information based on the filter information when the system is in the low power mode.

The above system may be further configured wherein the filter information comprises at least one of instructions for handling information when the system is in the low power mode or an indication of conditions requiring the system to transition to the active mode for processing. In this example configuration, the network interface may be further configured to store received information in memory based on the instructions for handling information. In this example configuration the low-power processing circuitry may comprise processing resources configured to monitor a register associated with the memory and to retrieve the information stored by the network interface from the memory based on the register. In this example configuration the direct output thread may be further configured to process the stored information into audio information and to cause the audio circuitry to generate sound based on the audio information.

The above system may be further configured wherein the audio circuitry is further to configured to convert received sound into audio information. In this example configuration the low-power processing circuitry may be further configured to receive audio information from the audio circuitry and to store information in the memory based on the received audio information when the system is in a low power state. In this example configuration the network interface circuitry may be further configured to monitor a register associated with a memory and to retrieve the information stored by the low-power processing circuitry from the memory based on the register. In this example configuration the network interface circuitry may be further configured to process the retrieved information into one or more packets and to transmit the one or more packets to a network.

According to another aspect there is provided a method. The method may include receiving information from a network while the system is in a low power state, determining whether the system will need to transition from the low-power state to an active state to process the received information, determining whether the received information comprises audio information, and causing the system to generate sound based on the received information comprising audio information.

The above method may be further configured wherein determining whether to transition from the low-power state to an active state is based on comparing the received information to filter information.

The above method may be further configured wherein causing the system to generate sound comprises writing the received information comprising audio information to a memory location. In this example configuration the memory location may be accessible to low-power processing circuitry in the system, the low-power processing circuitry being configured to monitor the memory location, to generate audio information based on the received information, and to provide the audio information to audio circuitry in the system, the audio circuitry being configured to generate sound based on the audio information.

The above method may further comprise determining whether information for transmission on the network has been written to a second memory location by monitoring a register associated with the second memory location, and retrieving information for transmission from the memory location based on the determination. In this example configuration the method may further comprise transmitting the information for transmission on the network.

According to another aspect there is provided a method. The method may include determining whether information has been stored in a memory location, obtaining the information stored in the memory location based on the determination, generating audio information based on the stored information and providing the audio information to audio circuitry in the system.

The above method may be further configured wherein determining whether information has been stored in the memory location comprises monitoring a register associated with the memory location.

The above method may further comprise receiving audio information from the audio circuitry, and generating information for transmission on a network based on the audio information. In this example configuration the method may further comprise writing the information for transmission on a network to a second memory location.

According to another aspect there is provided a system arranged to perform any of the above example methods.

According to another aspect there is provided a communications device arranged to perform any of the above example methods.

According to another aspect there is provided a chipset configured for at least communications, the chipset being arranged to perform any of the above communications-related example methods.

According to another aspect there is provided a chipset configured for at least low-power processing, the chipset being arranged to perform any of the above low-power processing-related example methods.

According to another aspect there is provided at least one machine readable medium comprising a plurality of instructions that, in response to be being executed on a computing device, cause the computing device to carry out any of the above example methods.

An apparatus for audio processing during low-power operation, configured to perform any of the above example methods.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A system, comprising:
    main platform circuitry configured to operate when the system is in an active state;
    network interface circuitry configured to receive filter information from the main platform circuitry when the system transitions from the active state to a low power state, and to operate using the filter information when the system is in the low power state;
    audio circuitry configured to at least generate sound based on audio information; and
    low-power processing circuitry configured to at least retrieve information stored in a memory by the network interface and to provide audio information based on the retrieved information to the audio circuitry when the system is in the low power state.

2. The system of claim 1, wherein the network interface comprises:
    circuitry configured to transmit information to, and receive information from, at least one network; and
    circuitry configured to handle the received information based on the filter information when the system is in the low power state.

3. The system of claim 1, wherein the filter information comprises at least one of instructions for handling information when the system is in the low power state or an indication of conditions requiring the system to transition to the active state for processing.

4. The system of claim 3, wherein the network interface is further configured to store received information in memory based on the instructions for handling information.

5. The system of claim 4, wherein the low-power processing circuitry comprises processing resources configured to monitor a register associated with the memory and to retrieve the information stored by the network interface from the memory based on the register.

6. The system of claim 5, wherein the low-power processing circuitry is further configured to process the stored information into audio information and to cause the audio circuitry to generate sound based on the audio information.

7. The system of claim 1, wherein the audio circuitry is further configured to convert received sound into audio information.

8. The system of claim 7, wherein the low-power processing circuitry is further configured to receive audio information from the audio circuitry and to store information in the memory based on the received audio information when the system is in a low power state.

9. The system of claim 8, wherein the network interface circuitry is further configured to monitor a register associated with a memory and to retrieve the information stored by the low-power processing circuitry from the memory based on the register.

10. The system of claim 9, wherein the network interface circuitry is further configured to process the retrieved information into one or more packets and to transmit the one or more packets to a network.

11. A system comprising network interface circuitry, low-power processing circuitry, and at least one non-transitory machine-readable storage medium, wherein said at least one non-transitory machine-readable storage medium comprises, individually or in combination, instructions that when executed by one or more processors result in the following operations comprising:
    receiving, with said network interface circuitry, information from a network while the system is in a low-power state;
    determining, with said network interface circuitry, whether to transition the system from the low-power state to an active state to process the received information;
    determining, with said network interface circuitry, whether said received information comprises audio information; and
    causing, with said low-power processing circuitry, said system to generate sound based on the received information when said received information comprises audio information.

12. The system of claim 11, wherein determining whether to transition from the low-power state to an active state is based on comparing the received information to filter information.

13. The system of claim 11, wherein causing the system to generate sound comprises writing the received information comprising audio information to a memory location.

14. The system of claim 13, wherein causing said system to generate sound further comprises monitoring the memory location with the low-power processing circuitry, providing audio information in the received information stored in the memory location to audio circuitry of the system, and generating sound with the audio circuitry based on the audio information.

15. The system of claim 11, wherein said instructions when executed further result in performance of the following operations comprising:
    determining, with said network interface circuitry, whether information for transmission on the network has been written by the low-power processing circuitry to a second memory location by monitoring a register associated with the second memory location; and
    when said second memory location includes information for transmission on the network, retrieving the information for transmission from the second memory location with the network interface circuitry.

16. The system for claim 15, further comprising transmitting the information for transmission on the network with said network interface circuitry.

17. A method, comprising:
    receiving, with network interface circuitry of a system, information from a network while the system is in a low-power state;
    determining, with the network interface circuitry, whether to transition the system from the low-power state to an active state to process the received information;
    determining, with the network interface circuitry, whether the received information comprises audio information; and
    causing, with low-power processing circuitry of said system, said system to generate sound based on the received information when the received information comprises audio information.

18. The method of claim 17, wherein determining whether to transition from the low-power state to an active state is based on comparing the received information to filter information.

19. The method of claim 17, wherein causing the system to generate sound comprises writing the received information comprising audio information to a memory location.

20. The method of claim 19, wherein causing the system to generate sound further comprises monitoring the memory location with the low-power processing circuitry, providing audio information in the received information stored in the memory location to audio circuitry of the system, and generating sound with the audio circuitry based on the audio information.

21. The method of claim 17, further comprising:
determining, with the network interface circuitry, whether information for transmission on the network has been written by the low-power processing circuitry to a second memory location by monitoring a register associated with the second memory location; and
when said second memory location includes information for transmission on the network, retrieving the information for transmission from the second memory location with the network interface circuitry.

22. The method of claim 21, further comprising transmitting the information for transmission on the network with the network interface circuitry.

* * * * *